(12) United States Patent
Burrows

(10) Patent No.: US 6,518,078 B2
(45) Date of Patent: *Feb. 11, 2003

(54) ARTICLES USEFUL AS OPTICAL WAVEGUIDES AND METHOD FOR MANUFACTURING SAME

(75) Inventor: Lee J. Burrows, San Francisco, CA (US)

(73) Assignee: California Institute of Technology, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,652

(22) Filed: Sep. 21, 1998

(65) Prior Publication Data

US 2002/0155633 A1 Oct. 24, 2002

(51) Int. Cl.⁷ .............................. G02B 6/10; H01L 21/00
(52) U.S. Cl. .......................................... 438/31; 385/129
(58) Field of Search ................................ 385/129, 142, 385/144; 438/31

(56) References Cited

U.S. PATENT DOCUMENTS

| | | | |
|---|---|---|---|
| 4,196,963 A | 4/1980 | Chen et al. | 350/96.12 |
| 4,640,736 A | 2/1987 | Holman | 156/603 |
| 5,064,684 A | 11/1991 | Mir et al. | 427/53.1 |
| 5,095,518 A | 3/1992 | Young et al. | 385/130 |
| 5,193,136 A | 3/1993 | Chang et al. | 385/129 |
| 5,478,371 A | * 12/1995 | Lemaire et al. | 65/384 |
| 6,091,879 A | * 7/2000 | Chan et al. | 385/143 |

FOREIGN PATENT DOCUMENTS

| | | | | |
|---|---|---|---|---|
| EP | 0 635 735 | | 6/1994 | G02B/6/12 |
| EP | 0 652 457 | | 9/1994 | G02F/1/035 |
| EP | 0673895 | A2 * | 9/1995 | |
| WO | WO99/63393 | | 12/1999 | |

OTHER PUBLICATIONS

Kwiatkowski et al., "Nearly cut–off modes caused by diffusion in lithium niobate," Journal of Applied Physics, vol. 76, No. 10, pp. 5877–5885, Nov. 15, 1994.

Nagata, et al. "Reduced thermal decomposition of OH–free $LiNbO_3$ substrates even in a dry gas atmosphere," Journal of Materials Research, Aug. 1996, Mater. Res. Soc., USA, vol. 11, No. 8, pp. 2085–2091.

Nozawa, et al. "Water Vapor Effects on Titanium Diffusion into $LiNbO_3$ Substrates," Japanese Journal of Applied Physics, vol. 29, No. 100, pp. 2180–2185, Oct. 1, 1990.

* cited by examiner

Primary Examiner—Richard Booth
(74) Attorney, Agent, or Firm—Thelen, Reid & Priest LLP; David B. Ritchie

(57) ABSTRACT

A method for manufacturing an article capable of constraining a propagating wave is disclosed. The method includes contacting a crystalline substrate with a source of deuterium ions to create a region in the crystalline substrate having a crystal structure that includes deuterium ions. The region is capable of constraining a propagating wave to the region.

11 Claims, 4 Drawing Sheets

ARTICLES USEFUL AS OPTICAL WAVEGUIDES AND METHOD FOR MANUFACTURING SAME

BACKGROUND OF THE INVENTION

This invention relates to preparing crystalline substrates useful for optical waveguides.

Crystalline $LiNbO_3$ and $LiTaO_3$ are used in optical waveguides. Integrated optic circuits based upon such optical waveguides are useful in various electrooptical devices including, e.g., fiber optic gyros (FOGs), photonic switching devices, and intensity/phase modulation systems. A variety of methods exist for fabricating $LiNbO_3$ and $LiTaO_3$ integrated optic circuits. Examples of these methods include localized diffusion of hydrogen into a $LiNbO_3$ or $LiTaO_3$ substrate, and proton exchange with the lithium present in the $LiNbO_3$ or $LiTaO_3$ substrate. These methods alter one or more refractive indices (e.g., the extraordinary and ordinary refractive indices) of the substrate in the region containing the diffused hydrogen to produce an optical waveguide.

During fabrication of the optical waveguide, protons replace the lithium atoms of the crystal structure. These protons are relatively small in comparison to the lithium atom and thus tend to move about the crystal structure of the waveguide. As a result, optical waveguides, the refractive index, and the region of guide itself tend to drift over time, which alters the output intensity of the waveguide. The waveguides must then be reset or recalibrated to correct for drift.

SUMMARY OF THE INVENTION

In one aspect, the invention features a method for manufacturing an article. The method includes contacting a crystalline substrate with a source of deuterium ions to create a region in the crystalline substrate having a crystal structure that includes deuterium ions. The region is capable of constraining a propagating wave to the region. In one embodiment, the crystalline substrate has a first refractive index and the region has a second refractive index. The second refractive index being different from the first refractive index. In preferred embodiments, the substrate is $LiNbO_3$ or $LiTaO_3$.

In one embodiment, the article is an optical waveguide.

In other preferred embodiments, the method further includes annealing the substrate. In another embodiment, the method further includes depositing an electrode pattern on the crystalline substrate. The electrode pattern is capable of modulating a wave propagating through the region.

In one embodiment, the invention features a method for manufacturing an optical waveguide. The method includes contacting a crystalline substrate having a refractive index with a source of deuterium ions to create a region that includes deuterium ions, and annealing the crystalline substrate for a time and at a temperature sufficient to create an optical waveguide. In preferred embodiments, the region has a refractive index different from the refractive index of the crystalline substrate.

In another aspect, the invention features an article that includes a crystalline substrate that includes a region that includes deuterium ions. The region is capable of constraining a propagating wave to the region. Preferred substrates include $LiNbO_3$ and $LiTaO_3$. In one embodiment, the crystalline substrate has a first refractive index and the region has a second refractive index. The second refractive index of the region is different from the first refractive index of the crystalline substrate. In other embodiments, the region is capable of constraining a propagating optical wave to the region.

In preferred embodiments, the article is an optical waveguide. In one embodiment, the article is an integrated optic circuit. Preferably the integrated optic circuit comprises electrodes positioned to modulate a wave propagating through said article. In other embodiments, the region is capable of supporting transverse magnetic propagation of a wave, transverse electric propagation of a wave, or both transverse magnetic propagation of a wave and transverse electric propagation of a wave.

In other aspects, the invention features a method for manufacturing an article. The method includes contacting a crystalline substrate with a source of tritium ions to create a region in the crystalline substrate having a crystal structure that includes tritium ions. The region is capable of constraining a propagating wave to the region.

In other aspects, the present invention is directed to the calculation, storage and retrieval of data for determining the depth of diffusion of lithium displacing ions in a crystalline substrate that includes lithium ions, and for use in a method for fabricating an optical waveguide. The data and control processes of the invention can be implemented by a software application program executed in a general purpose computing system and in combination with an ion bath.

The data and control processes of the invention can be embodied in a lithium ion displacing diffusion process implemented via the application program and also in an article of manufacture, in the form of a data storage medium that stores application program code arranged to carry out that method upon execution by a processor.

The optical waveguides of the invention are relatively optically and electrically stable such that they exhibit minimal thermal and electrical field drift.

Other features and advantages of the invention will be apparent from the following description of the preferred embodiments thereof, and from the claims.

DESCRIPTION OF THE PREFERRED EMBODIMENTS

Figure 1:
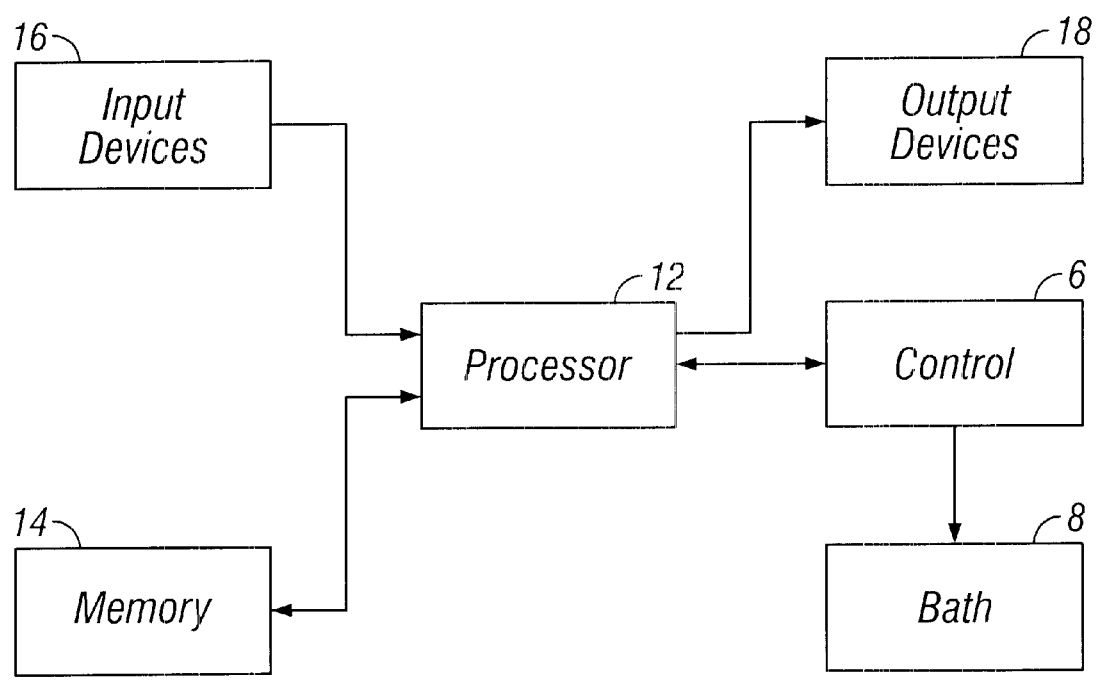
FIG. 1 is a functional block diagram of a computing system configured for calculating depth of diffusion and for driving a waveguide manufacturing apparatus of the present invention.

The invention features an article such as an optical waveguide that is capable of constraining a propagating wave. The article is prepared from a crystalline substrate having the formula $RMO_3$ where R is an alkaline earth metal, and M is a Group IVB or Group VB metal such as niobium or titanium. A variety of materials can be used as the crystalline substrate provided they can be treated to constrain the propagation of a wave. Preferred crystalline substrates permit wave modulation. Suitable substrate crystal structures include, e.g., monoclinic, rhombohedral, orthorhombic, tetragonal, and hexagonal. Preferably the crystalline substrate is a single crystal. Examples of useful optical crystalline substrates include $LiNbO_3$, $LiTaO_3$, and $Ag_3AsS_3$.

The article is treated to create a region, preferably in the form of a channel, in which some of the lithium ions are replaced with deuterium or tritium ions. The channel has one or more refractive indices that differ from the refractive index(pl) of the untreated crystalline substrate. Preferably the channel exhibits no decrease to a slight decrease in extraordinary refractive index relative to the bulk of the untreated substrate, and an increase in ordinary refractive index relative to the bulk of the untreated substrate. The channel is capable of constraining a propagating wave such that the wave propagates through the channel and is not scattered or diffused through the bulk of the untreated crystalline substrate. Preferably the article exhibits the property of allowing a wave propagating through the article to be modulated by an external force.

Articles capable of constraining a propagating wave can be prepared by contacting a crystalline substrate with a source of deuterium ions such that the deuterium ions diffuse through the crystalline substrate to a predetermined depth and in a predetermined dimension to form a region (e.g., a channel) in the substrate that includes deuterium ions. During diffusion, ions of the crystalline substrate (e.g., the lithium ions of a $LiNbO_3$ substrate) are exchanged with deuterium ions throughout the crystal structure of the substrate such that the deuterium ions occupy sites in the crystal lattice structure formerly occupied by ions of the crystalline substrate, e.g., lithium ions. The deuterium ions are preferably confined to a narrow region so as to form a channel extending from one end of the substrate to another end of the substrate.

Useful sources of deuterium ions include, e.g., deuterated acids. Examples of useful deuterated acids include deuterated sulfuric acid, and deuterated benzoic acid.

In one preferred embodiment, lithographic techniques are used to form a pattern on the crystalline substrate, which is used to define the channel in the optical waveguide. For example, the method for preparing the article can include applying a masking layer of material, e.g., aluminum, chromium, titanium or silicon dioxide, to the surface of a substrate. A photoresist film is then deposited onto the masking layer of the substrate and patterned using ultraviolet light. The resist is developed so as to expose a pattern on the surface of the masking layer. The exposed pattern of masking layer is then dry etched to produce the waveguide channels on the surface of the substrate, with the unetched portion of the masking layer acting as a mask to prevent contact between the substrate and the source of deuterium ions. The channel widths can be of a dimension suitable for the intended wavelength of the wave to be constrained. Useful channel widths range from about 3 to about 10 microns.

The etched channels are then treated by exposing the area of the crystalline substrate defined by the etched channels to a source of deuterium ions, e.g., by immersing the crystalline substrate in a bath of deuterium ions (preferably a pure bath of deuterated sulfuric acid), for a period of time sufficient to achieve exchange of about 50% of the lithium ions with the deuterium ions. The rate of etching can be increased or decreased by increasing or decreasing the temperature of the source of deuterium ions. The source of deuterium ions, the surrounding environment (e.g., an oven chamber), and the substrate to be etched can be brought to the etch temperature prior to immersing the substrate in the source of deuterium ions.

In the case of deuterated sulfuric acid and a $LiNbO_3$ substrate, the substrate is preferably exposed to 99.8% $D_2SO_4$ (deuterated sulfuric acid) for a period ranging from about 60 hours to about 0.09 hours at a temperature in the range of from about 120° C. to about 240° C.

The deuterium ion treated substrate is then removed from the deuterium ion source (e.g., the acid bath), and, optionally, annealed to drive the deuterium ions farther into the depth of the crystalline substrate. Useful annealing conditions include heating the treated crystalline substrate to a temperature in the range of about 300° C. to about 400° C. for a period of from 12 to 4 hours under an atmosphere of $D_2O$ with $O_2$ bubbling through the $D_2O$ and the oven chamber. After anneal the substrate preferably contains less than about 12% deuterium ions in the channel.

These process parameters can be altered depending upon the crystalline substrate, the source of deuterium ions, and the conditions of the bath and the anneal (e.g., the pH of the bath, the temperature surrounding the crystalline substrate). The influence of some of the process parameters is disclosed below.

The invention also features a method for manufacturing an optical waveguide having predetermined dimensions using a predetermined rate of diffusion of lithium displacing ions (e.g., hydrogen, deuterium, and tritium) into a substrate, e.g., a $LiNbO_3$ substrate. The method can be used to determine the depth of diffusion that results from the process of contacting the substrate with a lithium displacing ion to form a treated substrate, and the depth of diffusion that results from the process of annealing the treated substrate. The method also allows for the automated realtime calculation of the depth of diffusion, as well as calculation of the time required to achieve a desired depth of diffusion of lithium displacing ions into a substrate.

FIG. 1 is a functional block diagram of an exemplary computing system for calculating the depth of diffusion of a lithium displacing ion into a crystalline substrate in accordance with an embodiment of the present invention. As shown in FIG. 1, system 10 may include a processor 12, a memory 14 (e.g., a random access memory (RAM), and a program memory (for example, a writable read-only memory (ROM) such as a flash ROM)), input devices 16, output devices 18 and a controller interface 6 for controlling the bath 8. Processor 12 includes a central processing unit (CPU) that forms part of a general purpose computer, such as a PC, Macintosh, or workstation. Memory 14 stores program code for execution by processor 12 including operating system code and application program code, and generally represents a magnetic hard drive or other storage device in combination with a random access memory accessed by processor 12. As one example, memory 14 could be realized in part by a storage drive contacting removable storage media carrying the application program code. Input devices 16 include input media for entry of user input such as a keyboard, mouse, and the like. Output devices 18 include display devices including view screen that provides graphic output, e.g., a CRT or flat panel monitor, a printer (e.g., a desk top printer, an ink jet printer, a laser printer, a photoplotter, and the like), a controller for controlling diffusion bath and the clock, and the like.

Figure 2A:
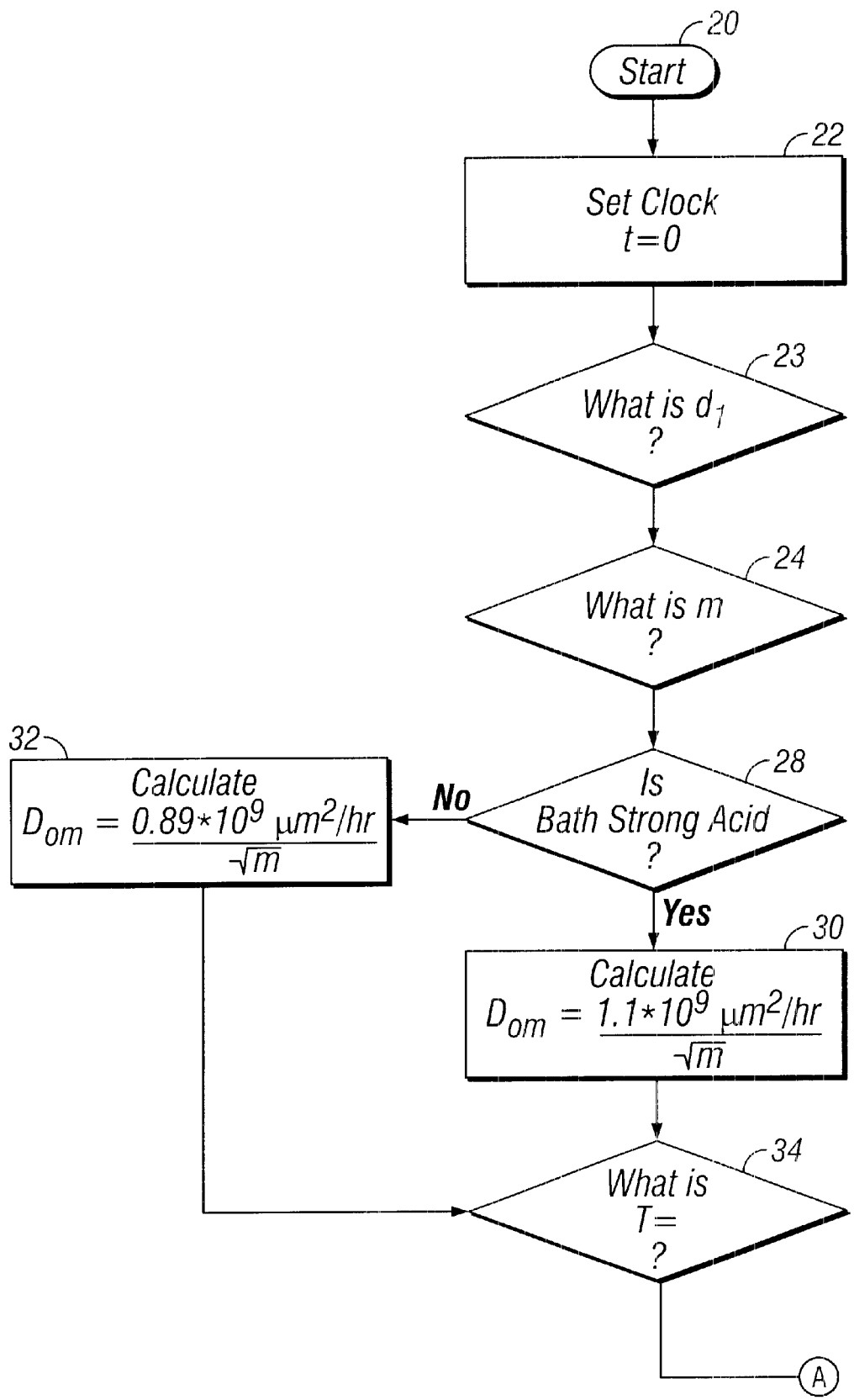
FIG. 2 is a flow diagram illustrating a method for calculating the depth of diffusion of lithium dissociating ions into a lithium based crystalline material and for forming an optical waveguide of the present invention.
Figure 2B:
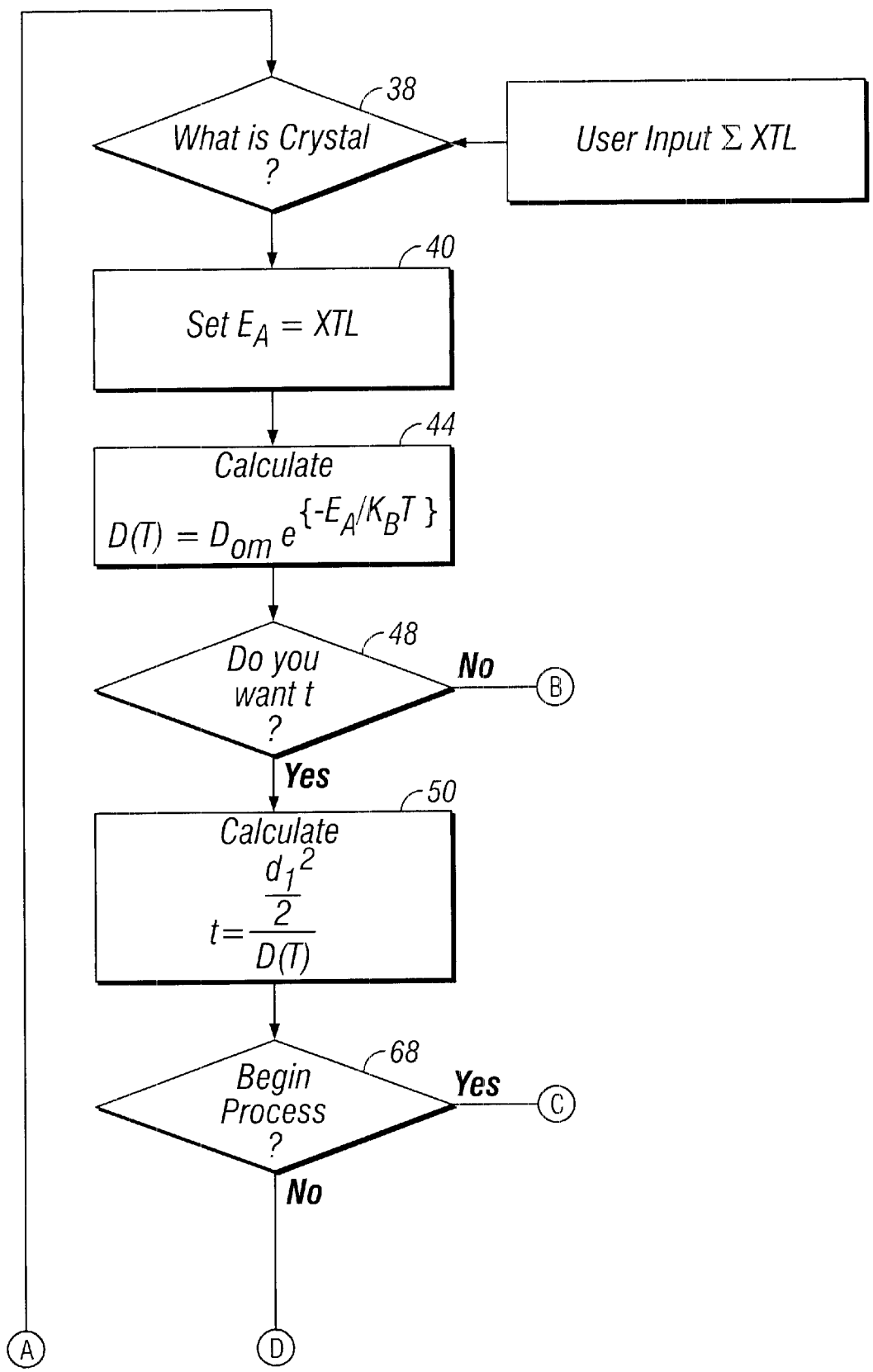
Figure 2C:
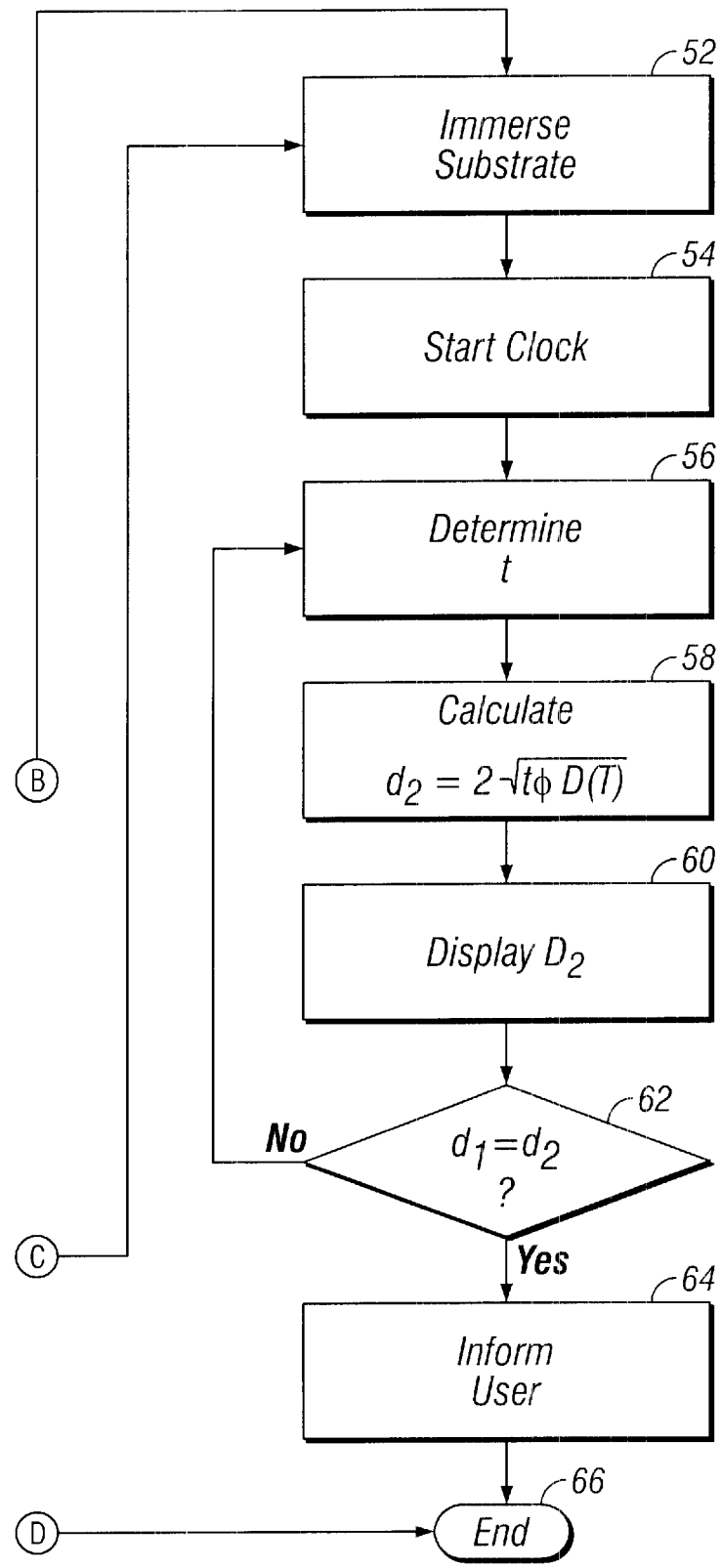

FIG. 2 is a flow diagram illustrating a method for calculating the depth of diffusion of a lithium displacing ion into a lithium containing crystalline material. When the user starts the application program, as indicated by reference numeral 20, processor 12 signals the control interface for the bath to perform a bath initialization and to set the clock (not shown) equal to zero as indicated by block 22. Processor 12 queries the user via output device 18 for a desired depth of diffusion. Processor 12 receives input from the user via input device 16, assigns the input to variable $d_1$ and stores $d_1$ in memory 14 (as indicated by block 23). Processor 12 queries the user via output device 18 for the mass (m) of the lithium displacing ion, e.g., for protons m=1 and for deuterons m=2, (as indicated by block 24). Processor 12 queries the user via output device 18 whether the bath is a strong acid bath (i.e., an acid having a pH of 0 to about 2) (indicated by block 28). Processor 12 receives input from the user via input device 16. If the user input indicates that the bath is a strong acid bath, processor 12 calculates temperature independent diffusion constant $D_{OM}$ according to the following equation:

$$D_{om} = \frac{1.1*10^9 \text{ um}^2/\text{hr}}{\sqrt{m}}$$

(as indicated by block 30). If the user input indicates that the bath is a weak acid bath (i.e., an acid having a pH of about 2 to about 3) and processor 12 calculates constant $D_{OM}$ according to the following equation:

$$D_{om} = \frac{0.89*10^9 \text{ um}^2/\text{hr}}{\sqrt{m}}$$

(as indicated in block 32). Processor 12 queries the user via output device 18 and/or thermocouple for the temperature in degrees Kelvin of the acid bath (as indicated by block 34). The user or the thermocouple then provides processor 12 with the temperature via input device 16 or controller interface 6. Processor 12 queries user via output device 18 for the type of crystal substrate (as indicated by block 38). The user provides the type of crystal substrate via input device 16. Processor 12 queries look-up table in memory 14 for the energy of activation ($E_A$) associated with the type of crystal structure input by the user (as indicated by block 40). If the crystalline substrate is $LiNbO_3$, then $E_A$=0.94 eV. Processor 12 calculates constant D(T) according to equation:

$$D(T) = D_{om}e^{[-E_A/K_BT]}$$

(as indicated by block 44), where $D_{OM}$ is the above calculated constant, $E_A$ is the energy of activation for the crystalline substrate, $K_B$ is Boltzman's constant ($K_B$=1.38*10$^{-23}$ J/° K=8.614*10$^{-5}$ eV/° K), and T is the temperature surrounding the substrate (e.g, the temperature of the acid bath) in degrees Kelvin.

Processor 12 queries the user via output device 18 whether the user seeks the time (t) required to achieve the desired depth of diffusion (as indicated by block 48). The user provides the requested information via input device 16. If yes, processor 12 calculates (t) according to the following equation $$t = \frac{\frac{d_1^2}{2}}{D(T)}$$

and provides the value of (t) to output 18 (as indicated by block 50). Processor 12 then queries the user whether the lithium ion displacing process should begin (as indicated by block 68). The user provides the requested information via input device 16. If yes, processor 12 signals the user or the control interface for the bath to immerse the crystalline substrate into the acid bath (as indicated by block 52). If not, the program ends (as indicated by reference numeral 66).

If the user input is "no" in response to the above query regarding time not, processor 12 signals the user via output 16 or the control interface 6 for the bath to immerse the crystalline substrate in the acid bath (as indicated by block 52). Processor 12 simultaneously starts the bath clock (as indicated by block 54). Processor 12 periodically polls the bath clock to determine the amount of elapsed time (t) (as indicated by block 56). Processor 12 calculates the depth of diffusion ($d_2$) according to equation:

$$d_1 = 2\sqrt{t*D(T)}$$

(as indicated by block 58). Processor 12 displays depth of diffusion (d2) to user via output device 18 (as indicated by block 60). Processor 12 determines whether $d_1=d_2$ (as indicated by block 62). If yes, processor 12 sends output to output device 18 indicating depth of diffusion has been achieved and signals the bath or the user to remove the crystalline substrate from the bath as shown by block 64, and the process ends.

If $d_1$ does not equal $d_2$, processor 12 continues to periodically poll the bath clock for the amount of elapsed time (block 56), calculates $d_2$ (block 58), and determines whether $d_1=d_2$ (block 62).

The invention will now be described further by way of the following examples.

EXAMPLES

Waveguide Preparation

Example 1

Optical waveguides were prepared as follows. A $LiNbO_3$ substrate (Ẑ-cut) was immersed in a bath of deuterated sulfuric acid (98% purity (Aldrich)) located in an oven. The oven temperature was ramped from 23° C. at a rate of 0.5° C./min to a temperature of 160° C., held at 160° C. for a period of about 190 minutes and cooled to a temperature of 20° C. at a rate of 1° C./min. The etched substrate was rinsed with distilled water to remove excess acid. The deuterium ion exchange depth was calculated to be 0.19 um.

The treated substrate was then placed in an oven, and the oven temperature was ramped from 23° C. to 360° C. at a rate of 1° C./min, held at 360° C. for a period of two hours, and cooled to 20° C. at a rate of 1° C./min under an atmosphere of dry oxygen.

The treated substrate was then subjected to a second anneal in which the temperature of the oven was ramped from 23° C. to 360° C. at a rate of 1° C./min, held at 360° C. for a period of four hours, and cooled to a temperature of 20° C. at a rate of 1° C./min under an atmosphere of dry oxygen.

The output wave produced by a 632.8 nm helium-neon laser was found to guide through the treated substrate with a loss of −6.13 dB/cm for a 5 um wide waveguide, and −5.14 dB/cm for a 6 um wide waveguide.

Example 2

A 2001 Å layer of $SiO_2$ was deposited on a 1 in.×0.3 in. $LiNbO_3$ wafer, patterned using lithographic techniques, and etched using a reactive ion etch to expose a pattern of the $LiNbO_3$ substrate. The etched substrate was then cleaned with acetone.

The $LiNbO_3$ substrate was then immersed in a bath of deuterated sulfuric acid (98% purity (Aldrich)) located in an oven. The oven temperature was ramped from 23° C. to 160°

C. at a rate of 0.5° C./min, held at 160° C. for a period of 191 minutes, and cooled to a temperature of 20° C. at a rate of 1° C./min. The etched substrate was rinsed with distilled deuterated water to remove excess acid. The deuterium ion exchange depth was calculated to be 0.19 um.

The treated substrate was then annealed by placing the substrate in an oven, and ramping the oven temperature from 23° C. to 360° C. at a rate of 1° C./min. The oven temperature was held at 360° C. for a period of four hours and then cooled to 20° C. at a rate of 1° C./min under an atmosphere of dry oxygen.

The output wave produced by a 632.8 nm helium-neon laser was found to guide through the treated substrate with a loss of −7.46 dB/cm for a 5 um wide waveguide, and −6.53 dB/cm for a 6 um wide waveguide.

Other embodiments are within the claims. For example, although the article has been described as having a region that includes deuterium ions, the article can include tritium ions. Accordingly, the method for preparing the article can also include contacting a crystalline substrate with a source of tritium ions.

The regions of deuterium or tritium ions can be in the form of a variety of patterns that incorporate splitters in a cascading arrangement. The splitters can include Y-junctions arranged in the form of, e.g., a NXM star coupler, where N is a number of input multiplexers and M is a number of output splitters. The star coupler accepts optical signal power from N inputs, combines the N input powers into a single guide and then splits the guide output into M equal parts. Examples of patterns useful in optical waveguide applications are described in U.S. Pat. No. 4,953,935 (Suchoski, Jr. et al.), U.S. Pat. No. 4,984,861 (Suchoski, Jr. et al.), and U.S. Pat. No. 5,223,911 (Suchoski, Jr. et al.).

Metallic electrode patterns can be formed by deposition and photolithographic methods on the surface of the treated crystalline substrate to generate electrode patterns on the crystalline substrate. These electrode patterns can be used to create an integrated optic circuit capable of modulating a wave propagating through the channel in the crystalline substrate.

What is claimed is:

1. A method for manufacturing an article, said method comprising:
    contacting a crystalline substrate with a source of deuterium ions; and
    exchanging ions of the crystalline substrate with deuterium ions so as to create a region in said crystalline substrate having a crystal lattice structure comprising deuterium ions,
    said region being capable of constraining a propagating wave to said region.

2. The method of claim 1, wherein said crystalline substrate has a first refractive index and said region has a second refractive index, said second refractive index being different from said first refractive index.

3. The method of claim 1, wherein said substrate is $LiNbO_3$.

4. The method of claim 1, wherein said substrate is $LiTaO_3$.

5. The method of claim 1, wherein said article is an optical waveguide.

6. The method of claim 1, further comprising annealing said substrate.

7. The method of claim 1, further comprising depositing an electrode pattern on said crystalline substrate, said electrode pattern being capable of modulating a wave propagating through said region.

8. A method for manufacturing an optical waveguide comprising:
    contacting a crystalline substrate with a source of deuterium ions, said crystalline substrate having a refractive index;
    exchanging ions of the crystalline substrate with deuterium ions so as to create a region in the crystalline substrate having a crystal lattice structure comprising deuterium ions; and
    annealing said crystalline substrate for a time and at a temperature sufficient to create a desired channel out of the region, said channel being capable of constraining a propagating wave to said channel.

9. The method of claim 8, wherein said region has a refractive index different from said refractive index of said crystalline substrate.

10. The method of claim 1, further comprising:
    limiting said contacting to a patterned area of the crystalline substrate, the patterned area defining said region.

11. The method of claim 8, further comprising:
    limiting said contacting to a patterned area of the crystalline substrate, the patterned area defining said region.

* * * * *

UNITED STATES PATENT AND TRADEMARK OFFICE
CERTIFICATE OF CORRECTION

PATENT NO. : 6,518,078 B2
DATED : February 11, 2003
INVENTOR(S) : Lee J. Burrows It is certified that error appears in the above-identified patent and that said Letters Patent is hereby corrected as shown below:

Column 1,
Line 5, please insert the following after the Title of Invention and before the "BACKGROUND OF THE INVENTION" -- STATEMENT AS TO RIGHTS TO INVENTIONS
The United States Government has certain rights in this invention pursuant to Grant No. F19628-95-C-0002 awarded by the United States Air Force. --

Signed and Sealed this

Tenth Day of June, 2003

JAMES E. ROGAN
*Director of the United States Patent and Trademark Office*